US012634113B2

(12) United States Patent
Kim et al.

(10) Patent No.: US 12,634,113 B2
(45) Date of Patent: May 19, 2026

(54) METHOD FOR PROCESSING DYNAMIC DATA BASED ON HOMOMORPHIC ENCRYPTION WHICH CARRIES OUT UNLIMITED ARITHMETIC OPERATIONS WITHOUT BOOTSTRAPPING AND REENCRYPTION OF CONTROL DATA

(71) Applicant: SEOUL NATIONAL UNIVERSITY R&DB FOUNDATION, Seoul (KR)

(72) Inventors: Junsoo Kim, Seoul (KR); Hyungbo Shim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 297 days.

(21) Appl. No.: 18/342,627

(22) Filed: Jun. 27, 2023

(65) Prior Publication Data

US 2023/0344618 A1 Oct. 26, 2023

Related U.S. Application Data

(63) Continuation of application No. PCT/KR2021/017080, filed on Nov. 19, 2021.

(30) Foreign Application Priority Data

Jan. 18, 2021 (KR) ........................ 10-2021-0006962

(51) Int. Cl.
*H04L 9/00* (2022.01)
*H04L 9/30* (2006.01)
(52) U.S. Cl.
CPC ............ *H04L 9/008* (2013.01); *H04L 9/3066* (2013.01)

(58) Field of Classification Search
CPC . H04L 9/008; H04L 9/3066; H04L 2209/805; H04L 2209/046
See application file for complete search history.

(56) References Cited

U.S. PATENT DOCUMENTS 9,374,220 B2 6/2016 Youn et al.
9,716,590 B2 7/2017 Gentry
(Continued)

FOREIGN PATENT DOCUMENTS

CA 3002582 A1 10/2017
CN 103856316 A 6/2014
(Continued)

OTHER PUBLICATIONS

Fully homomorphic encryption without bootstrapping, by Gentry et al., published 2014 (Year: 2014).*

(Continued)

*Primary Examiner* — Vu V Tran
(74) *Attorney, Agent, or Firm* — United One Law Group LLC; Kongsik Kim; Jhongwoo Peck

(57) ABSTRACT

A method for processing dynamic data in an environment. The environment includes a device to be controlled; a controller, a state equation of which is $x(t+1)=Fx(t)+Gy(t)$; a decryption module which decrypts an encrypted control command received from the controller; an actuator which operates according to the decrypted control command received from the decryption module; a sensor which detects the output ($y(t)$) of the device and an encryption module which carries out homomorphic encryption to the signal of the sensor.

4 Claims, 3 Drawing Sheets

(56)                References Cited

U.S. PATENT DOCUMENTS

| | | |
|---|---|---|
| 10,924,262 B2 | 2/2021 | Shim et al. |
| 2014/0153724 A1 | 6/2014 | Kim |
| 2014/0270159 A1 | 9/2014 | Youn et al. |
| 2017/0293913 A1 | 10/2017 | Gulak et al. |
| 2019/0182216 A1 | 6/2019 | Gulak et al. |
| 2019/0205875 A1 | 7/2019 | Gulak et al. |
| 2019/0363872 A1 | 11/2019 | Shim et al. |

FOREIGN PATENT DOCUMENTS

| | | |
|---|---|---|
| CN | 109314641 A | 2/2019 |
| EP | 2677680 A1 | 12/2013 |
| EP | 2741529 A3 | 3/2014 |
| EP | 2741529 A2 | 11/2014 |
| JP | 2019-514301 A | 5/2019 |
| KR | 10-2014-0071605 A | 6/2014 |
| KR | 10-2014-0114933 A | 9/2014 |
| KR | 10-1795771 B1 | 11/2017 |
| KR | 10-2018-0092199 A | 8/2018 |
| KR | 10-2018-0127506 A | 11/2018 |
| KR | 10-1919940 B1 | 11/2018 |
| KR | 10-2021-0042668 A | 4/2021 |
| KR | 10-2306635 B1 | 9/2021 |
| WO | 2017/177313 A1 | 10/2017 |
| WO | 2018/147497 A1 | 8/2018 |

OTHER PUBLICATIONS

Fully Homomorphic encryption without Bootstrapping, by Yagisawa et al., published 2015 (Year: 2015).*
Cheon, J.H. et al., "Need for Controllers having Integer Coefficients in Homomorphically Encrypted Dynamic System", 2018 IEEE Conference on Decision and Control (CDC), 978-1-5386-1395-5/18/$31.00 © 2018 IEEE, Miami Beach, FL, USA, Dec. 17-19, 2018.

* cited by examiner

1

METHOD FOR PROCESSING DYNAMIC DATA BASED ON HOMOMORPHIC ENCRYPTION WHICH CARRIES OUT UNLIMITED ARITHMETIC OPERATIONS WITHOUT BOOTSTRAPPING AND REENCRYPTION OF CONTROL DATA

CROSS-REFERENCE TO RELATED APPLICATIONS

This application is a continuation application of International Application No. PCT/KR2021/017080 filed on Nov. 19, 2021, which claims priority to Korean Application No. 10-2021-0006962 filed on Jan. 18, 2021. The aforementioned applications are incorporated herein by reference in their entireties.

TECHNICAL FIELD

The present disclosure relates to a method for processing homomorphically-encrypted dynamic control data, more particularly to a method for processing homomorphically-encrypted dynamic control data, which carries out unlimited number of arithmetic operations to the homomorphically-encrypted data without bootstrapping nor re-encryption.

RELATED ART

In the environments where physical systems are connected to computers through network communications, control systems can be a target of cyber attackers. The integration of computation (cyber part), physical system (physical part), and communication (link between cyber and physical parts) is called cyber-physical systems (CPSs).

Due to its openness and connectivity, CPS is vulnerable to malicious attacks. Failure or malfunction of the critical infrastructure such as power plants, which is caused by attacks to the cyber-physical systems leads to tremendous catastrophe.

It can be considered to encrypt a control data for defending the cyber-physical system from the attacks. However, the controller which processes the encrypted data has to decrypt the received data in order to generate a control signal.

Further, the controller should have the secret key for decryption, which can be stolen by attackers. Thus, the security is still threatened even in the control system which adopts the encryption of data.

EP 2 677 680 A1 (published on Dec. 25, 2013) discloses a technique that homomorphic encryption (hereinafter referred to as "HE") is carried out to control data and arithmetic operations are carried out to the encrypted control data. However, noise increases as the number of computations to the HE control data increases. The scaling factor (proportional integer) is accumulated in the process of transforming a real number into an integer. Thus, finally, arithmetic operation becomes impossible. In order to resolve the situation, bootstrapping (re-booting) should be carried out. However, the encrypted state variables cannot be updated during the bootstrapping, thereby stopping the controller during the bootstrapping.

Korean Patent No. 10-1919940 (published on Nov. 19, 2018) discloses a method for updating homomorphically-encrypted state variables even during bootstrapping. According to the patent, while one of the multiple controllers carries out the bootstrapping, the other controllers update the encrypted state variables. However, the technology accompanies high cost and increases complexity since multiple controllers are introduced. Further, the technology still needs re-booting, thereby increasing operation time.

The present applicant filed a patent application for the invention where state matrices are converted to integer matrices so that unlimited number of arithmetic operations are possible, issued as KR Patent No. 10-2306635 (published on Sep. 28, 2021).

However, the prior patent requires re-encryption to the control signal, which is inappropriate in the system where multiple controllers process control algorithms in distributed manner.

SUMMARY

The object of the present disclosure is to provide a method for a method for processing homomorphically-encrypted dynamic control data, which carries out unlimited number of arithmetic operations to the homomorphically-encrypted data without bootstrapping (re-booting) nor re-encryption to the control data.

The present disclosure provides a computer-implemented method for processing dynamic data in the environment (e.g, a system) comprising a device to be controlled; a controller, the state equation of which is $x(t+1)=Fx(t)+Gy(t)$; a decryption module which decrypts an encrypted control command received from the controller; an actuator which operates according to the decrypted control command received from the decryption module; a sensor which detects the output $(y(t))$ of the device and an encryption module which carries out homomorphic encryption to the signal of the sensor.

The method comprises dividing, by the controller, the state equation into Schur stable part $(z_s(t+1)=F_s z_s(t)+G_s y(t))$ and Schur anti-stable part $(z_u(t+1)=F_u z_u(t)+G_u y(t))$; approximating, by the controller, the Schur stable part; and approximating, by the controller, the Schur anti-stable part.

Approximating the Schur stable part is $$\begin{bmatrix} z_{s,1}(t+1) \\ z_{s,2}(t+1) \\ \vdots \\ z_{s,k_1}(t+1) \end{bmatrix} \approx \begin{bmatrix} z_{s,2}(t) \\ \vdots \\ z_{s,k_1}(t) \\ 0 \end{bmatrix} + \begin{bmatrix} G_s \\ F_s G_s \\ \vdots \\ F_s^{k_1-1} G_s \end{bmatrix} y(t).$$

Approximating the Schur anti-stable part is $z_u(t+1) \approx F_0 z_u(t) + G_u y(t)$.

The state variable equation for generating control command in approximating the Schur anti-stable part is, $$\xi(k_2 t + 1) = \xi(k_2 t) + T_2 F_0^{-1} G_u y(t)$$

$$\xi(k_2 t + 2) = \xi(k_2 t + 1) + T_2 F_0^{-2} G_u y(t)$$

$$\vdots$$

$$\xi(k_2 t + k_2 - 1) = \xi(k_2 t + k_2 - 2) + T_2 F_0^{-(k_2-1)} G_u y(t)$$

$$\xi(k_2 t + k_2) = T_2 F_0^{k_2} T_2^{-1} \xi(k_2 t + k_2 - 1) + T_2 G_u y(t); \text{ and}$$

$z(t)=T_1 x(t)$; the absolute value of every eigenvalue of $F_s$ is less than 1; the absolute value of every eigenvalue of $F_u$ is equal to or greater than 1; $\xi(k_2 t)=T_2 z_u(k_2 t)$; $k_1$ is a sufficiently large natural number which satisfies the condition that $$\|F_s^{k_1}\|$$

converges to 0; and $k_2$ is a natural number which satisfies the conditions that $\|F_u - F_0\| < \varepsilon$, for a sufficiently small number $\varepsilon$ which is greater than 0 and $$T_2 F_0^{k_2} T_2^{-1} \in \mathbb{Z}^{n \times n} (F_0 \in \mathbb{R}^{n \times n} \text{ and } T_2 \in \mathbb{R}^{n \times n}).$$

It can be represented that $$\begin{bmatrix} z_{s,2}(t) \\ \vdots \\ z_{s,k_1}(t) \\ 0 \end{bmatrix} = A \begin{bmatrix} z_{s,1}(t) \\ z_{s,2}(t) \\ \vdots \\ z_{s,k_1}(t) \end{bmatrix},$$

where the matrix "A" is a matrix in which the elements directly above the diagonal elements are 1, and the remaining elements are 0.

$k_1$ and $k_2$ can be the same.

The present disclosure can be embodied in a computer program product comprising one or more computer-readable storage media and program instructions stored at least one of the storage media, the program instructions executable by a processor to cause the processor to perform the above method.

The present disclosure can be embodied in a computer-implemented system comprising one or more processors and one or more computer readable storage media storing computer-executable instructions that, when executed, cause the one or more processors to perform the method of the present disclosure.

Figure 1:
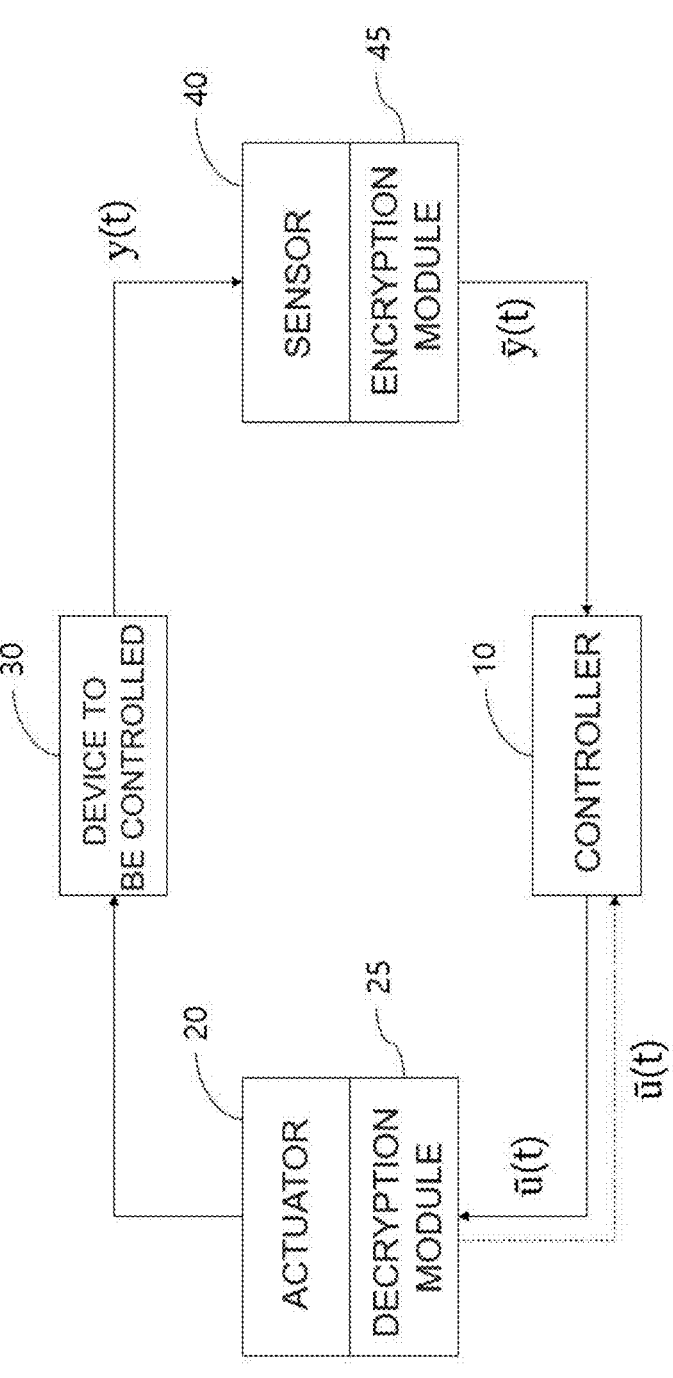
FIG. 1 is an exemplary block diagram of the environment where the method for processing dynamic data according to the present disclosure is carried out.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" or "include" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise," "include" and/or "comprising," "including" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled," "connect" and the like denotes a physical relationship between two components whereby the components are either directly connected to one another or indirectly connected via one or more intermediary components.

The term "module" or "unit" means a logical combination of a universal hardware and a software carrying out required function.

In this specification, the essential elements for the present disclosure will be described and the non-essential elements may not be described. However, the scope of the present disclosure should not be limited to the invention including only the described components. Further, it should be understood that the invention which includes additional elements or does not have non-essential elements can be within the scope of the present disclosure.

In this specification, "dynamic data" is defined as data which has no value or significantly reduced value if it is not processed within a certain period of time. Control data, streaming data and the like are examples of dynamic data. Further, "dynamic controller" is defined as a controller where a state variable therein is updated every operation time.

The method of the present disclosure can be carried out by the electronic arithmetic device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
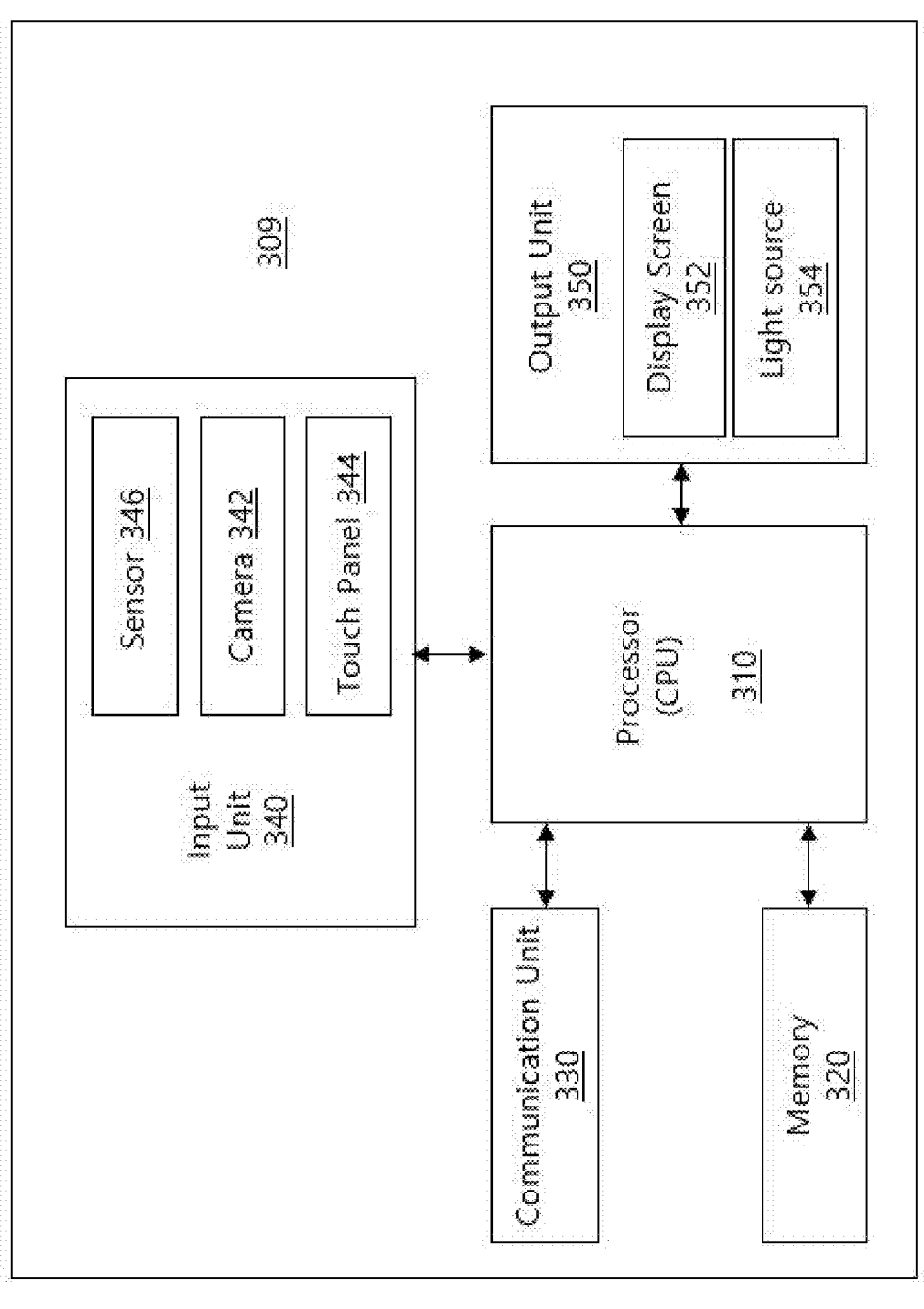
FIG. 3 is an exemplary block diagram of electronic arithmetic device carrying out the present disclosure.

A variety of devices can be used herein. FIG. 3 illustrates an example diagrammatic view of an exemplary device architecture according to embodiments of the present disclosure. As shown in FIG. 3, a device (309) may contain multiple components, including, but not limited to, a processor (e.g., central processing unit (CPU); 310), a memory (320; also referred to as "computer-readable storage media"), a wired or wireless communication unit (330), one or more input units (340), and one or more output units (350). It should be noted that the architecture depicted in FIG. 3 is simplified and provided merely for demonstration purposes. The architecture of the device (309) can be modified in any suitable manner as would be understood by a person having ordinary skill in the art, in accordance with the present claims. Moreover, the components of the device (309) themselves may be modified in any suitable manner as would be understood by a person having ordinary skill in the art, in accordance with the present claims. Therefore, the device architecture depicted in FIG. 3 should be treated as exemplary only and should not be treated as limiting the scope of the present disclosure.

The processor (310) is capable of controlling the operation of the device (309). More specifically, the processor (310) may be operable to control and interact with multiple components installed in the device (309), as shown in FIG. 3. For instance, the memory (320) can store program instructions that are executable by the processor (310) and data. The process described herein may be stored in the form of program instructions in the memory (320) for execution by the processor (310). The communication unit (330) can allow the device (309) to transmit data to and receive data from one or more external devices via a communication network. The input unit (340) can enable the device (309) to receive input of various types, such as audio/visual input, user input, data input, and the like. To this end, the input unit (340) may be composed of multiple input devices for accepting input of various types, including, for instance, one or more cameras (342; i.e., an "image acquisition unit"), touch panel (344), microphone (not shown), sensors (346), keyboards, mice, one or more buttons or switches (not shown), and so forth. The term "image acquisition unit," as used herein, may refer to the camera (342), but is not limited thereto. The input devices included in the input (340) may be manipulated by a user. The output unit (350) can display information on the display screen (352) for a user to view. The display screen (352) can also be configured to accept one or more inputs, such as a user tapping or pressing the screen (352), through a variety of mechanisms known in the art. The output unit (350) may further include a light source (354). The device (309) is illustrated as a single component, but the device may also be composed of multiple, separate components that are connected together and interact with each other during use.

The term "value" described in this specification is defined as being universal value which includes vector, matrix, tensor and polynomial as well as scholar value.

The terms "first," "second," or the like are herein used to distinguishably refer to same or similar elements, or the steps of the present disclosure and they may not infer an order or a plurality.

In this specification, the encryption of a specific value includes the encryption of a value derived from the specific value.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In this specification, Dec(*) means a decrypted value of * and Enc(*) means a homomorphically-encrypted value of *. $\overline{*}$ means a homomorphically-encrypted value of *.

In this specification, [*] means a rounded value of *.

In this specification, it is assumed that the controller (10) is a discrete-time linear time-invariant controller. However, a person skilled in the arts can apply the present disclosure to the other types of linear controller or a time-variant controller without significant difficulties.

FIG. 1 is an exemplary environment of carrying out data processing of dynamic control data in accordance with the present disclosure.

The environment includes a controller (10), an actuator (20), a decryption module (25), a device (30) to be controlled, a sensor (40), and an encryption module (45).

Although the actuator (20) and the decryption module (25) are illustrated as being separate from each other in FIG. 1, they can be incorporated as an integral element. Further, although the sensor (40) and the encryption module (45) are illustrated as being separate from each other, they can be incorporated as an integral element. At least one of the decryption modules (25) and the encryption module (45) can be incorporated into the controller (10).

The decryption and the encryption can be carried out according to a symmetric key scheme or a public key scheme. If the symmetric key scheme is used, the decryption module (25) and the encryption module (45) have the same key. If the public key scheme is used, the decryption module (25) can have a secret key and the encryption module (45) can have a public key.

The actuator (20) actuates the device (30) according to the command (u(t)) generated by the controller (10). The sensor (40) detects the output of the device (30). The encryption module (45) encrypts the signal y(t) which is detected by the sensor (40). The encrypted value $\overline{y(t)}$ is transmitted to the controller (10). The decryption module (25) decrypts the output $\overline{u(t)}$ of the controller (10) and then the decrypted value is transmitted to the actuator (20).

The state-space representation of the control system of the present disclosure can be expressed as follows:

Note: In homomorphic encryption scheme, an arithmetic operation to a cyphertext generates an encryption value of the result generated by the same arithmetic operation to a plain text. Thus, in this specification, arithmetic operation to plain text will be described for simple expression.

$$x(t+1) = Fx(t) + Gy(t) \qquad \text{[Mathematical Equation 1]}$$

$$u(t) = Hx(t)$$

It is assumed that the matrices F, G, and H are real number matrices.

The state variable can always be divided into a Schur stable part (indicated with subscript "s") and a Schur anti-stable part (indicated with subscript "u") if a coordinate transformation ($z(t)=T_1x(t)$) is carried out to the state variable (step 200). The stable part and the anti-stable part are represented as follows:

$$z_s(t+1) = F_s z_s(t) + G_s y(t) \qquad \text{[Mathematical Equation 2]}$$

$$z_u(t+1) = F_u z_u(t) + G_u y(t)$$

$$u(t) = H_s z_s(t) + H_u z_u(t) = u_s(t) + u_s(t)$$

The transformation matrix "$T_1$" can be a matrix which represents the state matrix "F" as Jordan Canonical Form.

Absolute values of every eigenvalue ($\lambda$; $\lambda \in \mathbb{C}$) of $F_s$ are less than 1.

Absolute values of every eigenvalue ($\lambda$; $\lambda \in \mathbb{C}$) of $F_u$ are equal to or greater than 1.

If $$k_1 \to \infty, \left\| F_s^{k_1} \right\| \to 0.$$

Figure 2:
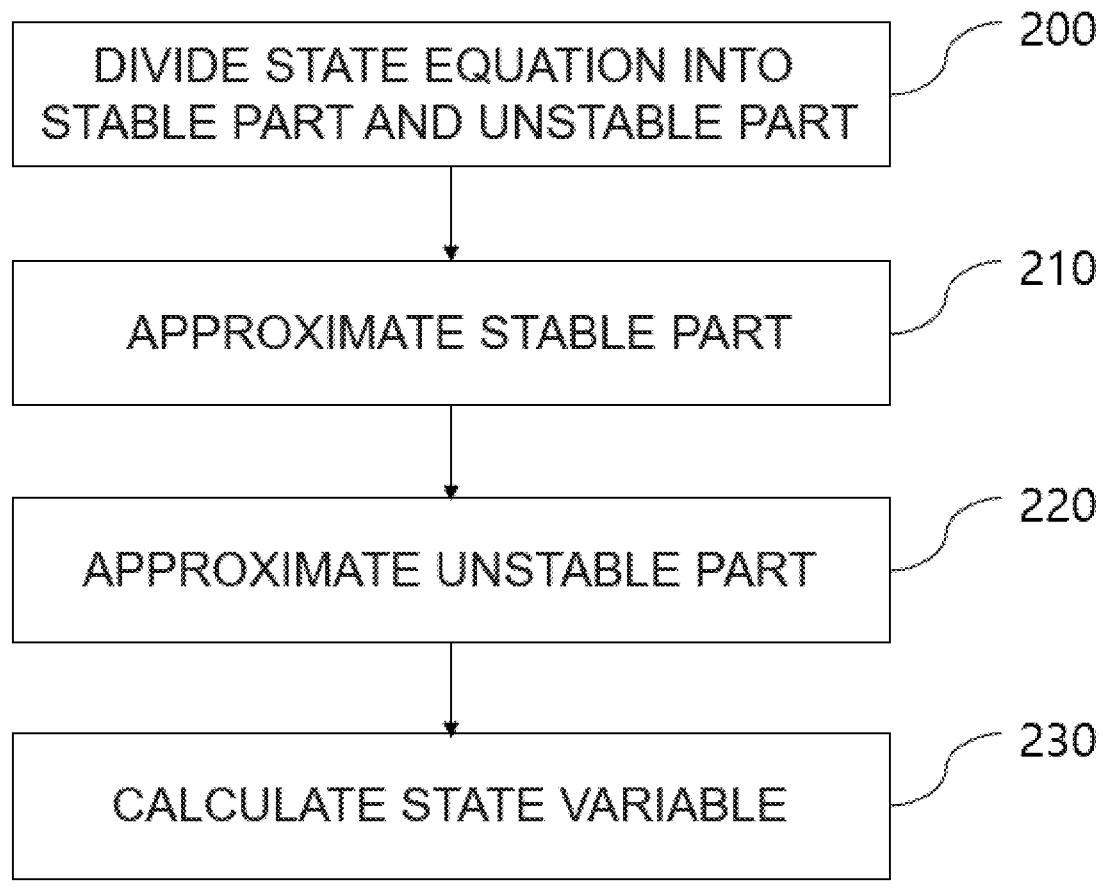
FIG. 2 is a flowchart of a method for processing dynamic data according to the present disclosure.

For a sufficiently large natural number $k_1$, the stable part can be approximated as Mathematical Equation 3 (step 210). Although it is illustrated in FIG. 2 that the stable part is approximated and then the anti-stable part is approximated, it is also acceptable to reverse the order. The approximation of the stable part can be represented as follows:

$$z_s(t+1) = \qquad \text{[Mathematical Equation 3]}$$

$$F_s z_s(t) + G_s y(t) = F_s^{t+1} z_s(0) + G_s y(t) +$$

$$F_s G_s y(t-1) + \dots F_s^t G_s y(0) \approx G_s y(t) +$$

$$F_s G_s y(t-1) + \dots + F_s^{k_1-1} G_s y(t-k_1+1),$$

where $t \geq k_1$

Mathematical Equation 3 can also be represented in a matrix form as follows:

$$\text{[Mathematical Equation 4]}$$

$$\begin{bmatrix} z_{s,1}(t+1) \\ z_{s,2}(t+1) \\ \vdots \\ z_{s,k_1}(t+1) \end{bmatrix} \approx \begin{bmatrix} z_{s,2}(t) \\ \vdots \\ z_{s,k_1}(t) \\ 0 \end{bmatrix} + \begin{bmatrix} G_s \\ F_s G_s \\ \vdots \\ F_s^{k_1-1} G_s \end{bmatrix} y(t)$$

$$u_s(t) = H_s z_{s,1}(t)$$

Mathematical Equation 4 can be represented as follows:

$$\text{[Mathematical Equation 5]}$$

$$\begin{bmatrix} z_{s,1}(t+1) \\ z_{s,2}(t+1) \\ \vdots \\ z_{s,k_1}(t+1) \end{bmatrix} = A \begin{bmatrix} z_{s,1}(t) \\ z_{s,2}(t) \\ \vdots \\ z_{s,k_1}(t) \end{bmatrix} + \begin{bmatrix} G_s \\ F_s G_s \\ \vdots \\ F_s^{k_1-1} G_s \end{bmatrix} y(t)$$

The matrix "A" is a matrix in which only the elements immediately above the diagonal elements are 1, and the remaining elements are 0.

The state matrix "A" is an integer matrix in Mathematical Equation 5, and thus it can be understood that the state matrix of a control system in the stable part is an integer matrix. That is, an unlimited number of the arithmetic operations can be carried out for the homomorphically-encrypted form of Mathematical Equation 5.

In the step (230), $z_s$ can be calculated from the state variables of the stable part, which is calculated by Mathematical Equation 5.

In the step (200), the anti-stable part is approximated as follows:

$$\lim_{k \to \infty} \left( \left| a^k \right| \right)^{\frac{1}{k}} = a,$$

for a real number "a" which satisfies $|a| \geq 1$.

For a sufficiently small $\varepsilon$ which is greater than 0 and a complex number $\lambda$ which satisfies $|\lambda| \geq 1$, there exist a natural number "k" and a complex number $\lambda_0$ which satisfy $$|\lambda - \lambda_0| < \varepsilon, \ \lambda_0^k \in \mathbb{Z}.$$

The following lemma can be induced according to the above relationship.

[LEMMA]

For anti-stable $F_u \in \mathbb{R}^{n \times n}$, there exist a natural number $k_2$, a matrix $F_0 \in \mathbb{R}^{n \times n}$ and a matrix $T_2 \in \mathbb{R}^{n \times n}$, which satisfy the following conditions:

$$\|F_u - F_0\| < \varepsilon, \ T_2 F_0^{k_2} T_2^{-1} \in \mathbb{Z}^{n \times n}$$

According to the lemma, the state equation in the anti-stable part can be represented as follows:

$$z_u(t+1) = F_u z_u(t) + G_u y(t) \approx F_0 z_u(t) + G_u y(t) \quad \text{[Mathematical Equation 6]}$$

$$u_u(t) = H_u z_u(t)$$

The following coordinate transformation by use of $T_2$ which satisfies $$T_2 F_0^{k_2} T_2^{-1} \in \mathbb{Z}^{n \times n},$$

is considered.

[Mathematical Equation 7]

$$\xi(k_2 t) = T_2 z_u(k_2 t)$$

$$\xi(k_2 t + 1) = T_2 F_0^{-1} z_u(k_2 t + 1)$$

$$\vdots$$

$$\xi(k_2 t + k_2 - 2) = T_2 F_0^{-(k_2-2)} z_u(k_2 t + k_2 - 2)$$

$$\xi(k_2 t + k_2 - 1) = T_2 F_0^{-(k_2-1)} z_u(k_2 t + k_2 - 1)$$

The above equations can be represented as follows:

[Mathematical Equation 8]

$$\xi(k_2 t + 1) = \xi(k_2 t) + T_2 F_0^{-1} G_u y(t)$$

$$\xi(k_2 t + 2) = \xi(k_2 t + 1) + T_2 F_0^{-2} G_u y(t)$$

$$\vdots$$

$$\xi(k_2 t + k_2 - 1) = \xi(k_2 t + k_2 - 2) + T_2 F_0^{-(k_2-1)} G_u y(t)$$

$$\xi(k_2 t + k_2) = T_2 F_0^{k_2} T_2^{-1} \xi(k_2 t + k_2 - 1) + T_2 G_u y(t)$$

According to the above transformation, the state matrix in the anti-stable part becomes an integer matrix. Thus, unlimited number of arithmetic operations can be carried out for the anti-stable part in its homomorphically-encrypted condition.

$z_u$ can be calculated from Mathematical Equation 7 after the transformed state variable $\xi$ is calculated from Mathematical Equation 8 (step 230).

The state variable x is calculated from $z_s$ and $z_u$ and thereafter the control data u is calculated. The calculated control data, more specifically, the homomorphically-encrypted control data is transmitted to the actuator (20).

$k_1$ and $k_2$ can be the same or can be different from each other.

According to the present disclosure, a state matrix having real numbers as its elements is divided into a stable part and an anti-stable part; each part is approximated; and then the state matrix is converted to an integer matrix. Thus, unlimited number of arithmetic operations can be carried out for homomorphically-encrypted data.

Although the present disclosure has been described with reference to accompanying drawings, the scope of the present disclosure is determined by the claims described below and should not be interpreted as being restricted by the embodiments and/or drawings described above. It should be clearly understood that improvements, changes, and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A computer-implemented method for processing dynamic data in an environment comprising a device to be controlled, a controller configured to encrypt data based on a state x(t) that dynamically changes according to a state equation x(t+1)=Fx(t)+Gy(t), a decryption module that decrypts an encrypted control data received from the controller, an actuator that operates according to the decrypted control data received from the decryption module, a sensor that detects output of the device, and an encryption module that carries out homomorphic encryption to signal of the sensor, the method comprising:

dividing, by the controller, the state equation into Schur stable part ($z_s$(t+1)=$F_s z_s$(t)+$G_s$y(t)) and Schur anti-stable part ($z_u$(t+1)=$F_u z_u$(t)+$G_u$y(t)), wherein F is a state matrix of the controller, G is an input matrix of the controller, x(t) is the state of the controller at time t, x(t+1) is a state of the controller at time t+1, and y(t) is the output of the device at time t, and wherein subscript "s" refers to the Schur stable part and subscript "u" refers to the Schur anti-stable part;

approximating, by the controller, the Schur stable part using the following equation:

$$\begin{bmatrix} z_{s,1}(t+1) \\ z_{s,2}(t+1) \\ \vdots \\ z_{s,k_1}(t+1) \end{bmatrix} \approx \begin{bmatrix} z_{s,2}(t) \\ \vdots \\ z_{s,k_1}(t) \\ 0 \end{bmatrix} + \begin{bmatrix} G_s \\ F_s G_s \\ \vdots \\ F_s^{k_1-1} G_s \end{bmatrix} y(t),$$

approximating, by the controller, the Schur anti-stable part using the following equation:

$$z_u(t+1) \approx F_0 z_u(t) + G_u y(t),$$

wherein the state variable equation for generating control data in approximating the Schur anti-stable part is, $$\xi(k_2 t + 1) = \xi(k_2 t) + T_2 F_0^{-1} G_u y(t)$$

$$\xi(k_2 t + 2) = \xi(k_2 t + 1) + T_2 F_0^{-2} G_u y(t)$$

$$\vdots$$

$$\xi(k_2 t + k_2 - 1) = \xi(k_2 t + k_2 - 2) + T_2 F_0^{-(k_2-1)} G_u y(t)$$

$$\xi(k_2 t + k_2) = T_2 F_0^{k_2} T_2^{-1} \xi(k_2 t + k_2 - 1) + T_2 G_u y(t); \text{ and}$$

wherein z(t)=$T_1$x(t); the absolute value of every eigenvalue of $F_s$ is less than 1; the absolute value of every eigenvalue of $F_u$ is equal to or greater than 1; $\xi(k_2 t)$=$T_2 z_u(k_2 t)$; $k_1$ is a sufficiently large natural number which satisfies the condition that $$\left\| F_s^{k_1} \right\|$$

converges to 0; $k_2$ is a natural number which satisfies the conditions that $\|F_u - F_0\| < \varepsilon$, for a sufficiently small number $\varepsilon$ which is greater than 0 and $$T_2 F_0^{k_2} T_2^{-1} \in \mathbb{Z}^{n \times n}(F_0 \in \mathbb{R}^{n \times n} \text{ and } T_2 \in \mathbb{R}^{n \times n});$$

and updating, by the controller, the state x(t+1) from the state x(t) according to the state equation.

2. The method according to claim 1, wherein $$\begin{bmatrix} z_{s,2}(t) \\ \vdots \\ z_{s,k_1}(t) \\ 0 \end{bmatrix} = A \begin{bmatrix} z_{s,1}(t) \\ z_{s,2}(t) \\ \vdots \\ z_{s,k_1}(t) \end{bmatrix},$$

and wherein the matrix "A" is a matrix in which the elements immediately above the diagonal elements are 1, and the remaining elements are 0.

3. The method according to claim 1, wherein $k_1$ and $k_2$ are equal.

4. A non-transitory computer-readable medium containing program instructions executable by a processor to cause the processor to perform a method comprising:

dividing, a state equation $x(t+1)=Fx(t)+Gy(t)$ into Schur stable part $(z_s(t+1)=F_s z_s(t)+G_s y(t))$ and Schur anti-stable part $(z_u(t+1)=F_u z_u(t)+G_u y(t))$, wherein F is a state matrix of the controller, G is an input matrix of the controller, x(t) is the state of the controller at time t, x(t+1) is a state of the controller at time t+1, and y(t) is the output of the device at time t, and wherein subscript "s" refers to the Schur stable part and subscript "u" refers to the Schur anti-stable part;

approximating, by the controller, the Schur stable part using the following equation:

$$\begin{bmatrix} z_{s,1}(t+1) \\ z_{s,2}(t+1) \\ \vdots \\ z_{s,k_1}(t+1) \end{bmatrix} \approx \begin{bmatrix} z_{s,2}(t) \\ \vdots \\ z_{s,k_1}(t) \\ 0 \end{bmatrix} + \begin{bmatrix} G_s \\ F_s G_s \\ \vdots \\ F_s^{k_1-1} G_s \end{bmatrix} y(t),$$

and approximating, by the controller the Schur anti-stable part using the following equation:

$$z_u(t+1) \approx F_0 z_u(t) + G_u y(t),$$

wherein the state variable equation for generating control command in the step of approximating the Schur anti-stable part is, $$\xi(k_2 t + 1) = \xi(k_2 t) + T_2 F_0^{-1} G_u y(t)$$

$$\xi(k_2 t + 2) = \xi(k_2 t + 1) + T_2 F_0^{-2} G_u y(t)$$

$$\vdots$$

$$\xi(k_2 t + k_2 - 1) = \xi(k_2 t + k_2 - 2) + T_2 F_0^{-(k_2-1)} G_u y(t)$$

$$\xi(k_2 t + k_2) = T_2 F_0^{k_2} T_2^{-1} \xi(k_2 t + k_2 - 1) + T_2 G_u y(t); \text{ and}$$

wherein $z(t)=T_1 x(t)$; the absolute value of every eigenvalue of $F_s$ is less than 1; the absolute value of every eigenvalue of $F_u$ is equal to or greater than 1; $\xi(k_2 t)=T_2 z_u(k_2 t)$; $k_1$ is a sufficiently large natural number which satisfies the condition that $$\left\| F_s^{k_1} \right\|$$

converges to 0; $k_2$ is a natural number which satisfies the conditions that $\|F_u - F_0\| < \varepsilon$, for a sufficiently small number $\varepsilon$ which is greater than 0 and $$T_2 F_0^{k_2} T_2^{-1} \in \mathbb{Z}^{n \times n} (F_0 \in \mathbb{R}^{n \times n} \text{ and } T_2 \in \mathbb{R}^{n \times n}),$$

and updating, by the controller, the state x(t+1) from the state x(t) according to the state equation.

\* \* \* \* \*